United States Patent
Enders et al.

(10) Patent No.: US 7,357,415 B2
(45) Date of Patent: Apr. 15, 2008

(54) PYROTECHNIC SAFETY DEVICE WITH RETRACTABLE TELESCOPING MECHANISM

(75) Inventors: Mark L. Enders, Pleasant View, UT (US); David J. Green, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 153 days.

(21) Appl. No.: 11/127,665

(22) Filed: May 11, 2005

(65) Prior Publication Data

US 2006/0255580 A1    Nov. 16, 2006

(51) Int. Cl.
*B60R 21/04* (2006.01)
(52) U.S. Cl. .................................... 280/753
(58) Field of Classification Search ............. 280/751, 280/752, 753
See application file for complete search history.

(56) References Cited

U.S. PATENT DOCUMENTS

| | | | | |
|---|---|---|---|---|
| 3,715,130 | A | * | 2/1973 | Harada et al. ............. 280/738 |
| 3,907,326 | A | * | 9/1975 | Arntson et al. ............ 280/752 |
| 5,549,327 | A | * | 8/1996 | Rusche et al. ............. 280/751 |
| 6,641,166 | B2 | | 11/2003 | Browne et al. ............ 280/752 |
| 2002/0125691 | A1 | | 9/2002 | Conlee et al. ............ 280/730.1 |
| 2003/0025314 | A1 | | 2/2003 | Figlioli et al. ............. 280/752 |
| 2003/0184070 | A1 | | 10/2003 | Vidal et al. ............... 280/752 |
| 2004/0006979 | A1 | | 1/2004 | Parks ........................ 60/412 |
| 2004/0046377 | A1 | | 3/2004 | Meduvsky et al. ........ 280/752 |

* cited by examiner

*Primary Examiner*—Paul N. Dickson
*Assistant Examiner*—Leonard McCreary, Jr.
(74) *Attorney, Agent, or Firm*—Sally J Brown; Stoel Rives LLP

(57) ABSTRACT

A safety device for use in an automobile that comprises a bolster and a telescoping mechanism. The telescoping mechanism extends when pressurized by the rapid introduction of a fluid. Following extension, the telescoping mechanism vents the fluid to allow the device to be retracted.

11 Claims, 6 Drawing Sheets

PYROTECHNIC SAFETY DEVICE WITH RETRACTABLE TELESCOPING MECHANISM

TECHNICAL FIELD

The present invention relates to the field of pyrotechnic safety devices. More specifically, the present invention relates to a safety device comprising a telescoping mechanism and a bolster. The telescoping mechanism is adapted to extend upon rapid introduction of a fluid and then retract by allowing the fluid to vent.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Described below are embodiments of a safety device for the restraint and protection of passengers in an automobile in the event of an impact. In one embodiment, the safety device is mounted in the instrument panel of an automobile and, upon impact, deploys toward the knees or lower legs of a passenger and resists the passenger's forward motion. The safety device deploys by pressurization with a fluid and depressurizes following deployment so that it does not pin the passenger inside the automobile.

Figure 1:
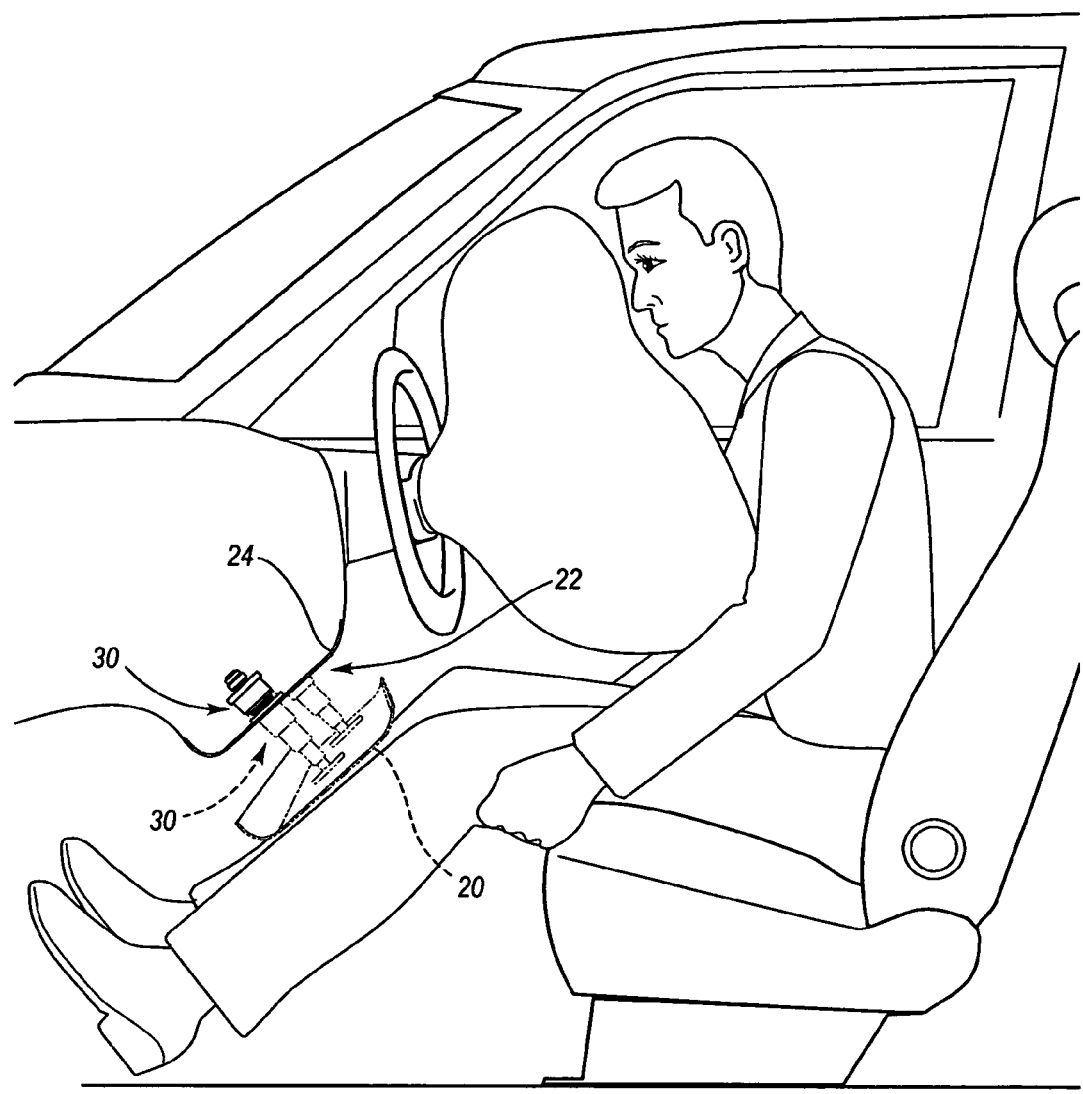
FIG. 1 is a side view of a knee protective telescoping pyrotechnic device mounted in an instrument panel of a vehicle.
Figure 2:
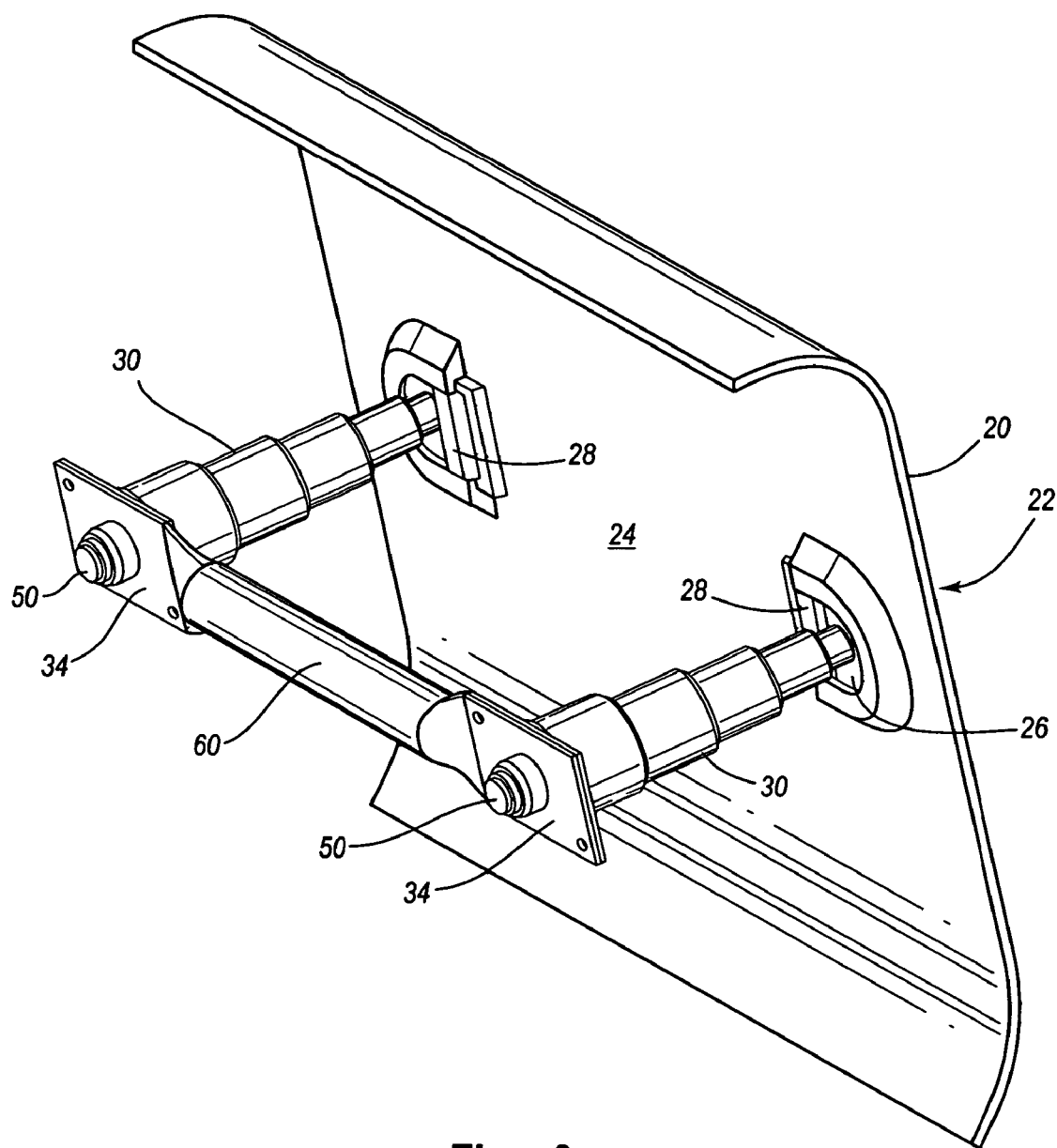
FIG. 2 is a perspective view of a telescoping pyrotechnic device.

FIG. 1 shows a knee protective embodiment 10 of the safety device in an instrument panel 12 of an automobile. FIG. 2 shows an enlarged view of knee protective pyrotechnic safety device 10. The device comprises a knee bolster 20 with a front face 22 and a back face 24. The back face 24 defines two receiving cavities 26 for receiving telescoping mechanisms 30. A locking plate 28 is welded on back face 24 across the cavity 26 to lock the telescoping mechanism in place. The knee bolster may be manufactured by any suitable method such as conventional injection molding. In an embodiment (not shown) of the device for use in the door of an automobile, the bolster is a pelvic restraint that conforms to the contours of the door. Knee bolster 20 and the pelvic restraint are examples of means for restraining a passenger of an automobile following an impact.

Figure 3:
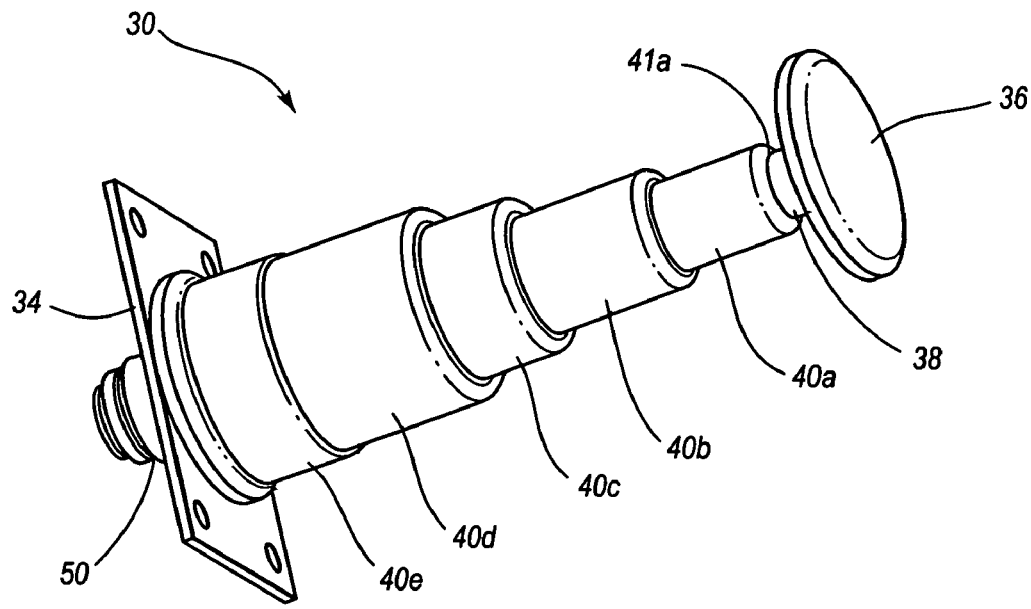
FIG. 3 is a perspective view of a telescoping mechanism in an extended position.
Figure 4:
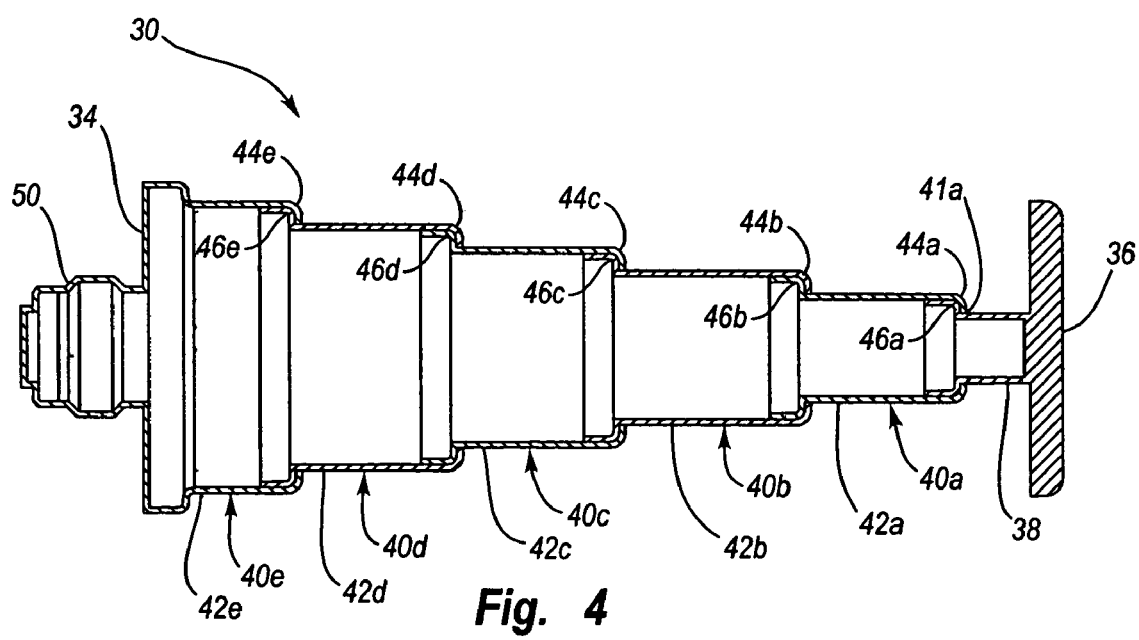
FIG. 4 is a cross-sectional view of a telescoping mechanism in an extended position.

The embodiment shown in FIG. 2 comprises two telescoping mechanisms 30 adapted to extend and deploy upon an impact. FIGS. 3 and 4 are perspective views of telescoping mechanism 30 in the extended position. Telescoping mechanism 30 comprises a base 34 for attaching the telescoping mechanism to a mounting bar 60 (shown in FIG. 2) and an attachment disc 36 for insertion into the receiving cavity in back face 24 of bolster 20. A stem 38 is connected to an attachment tip such as attachment disc 36. In one embodiment, attachment disc 36 is flexibly mounted in receiving cavity 26 to permit the device to respond to different impacts over the life of the device.

Figure 5:
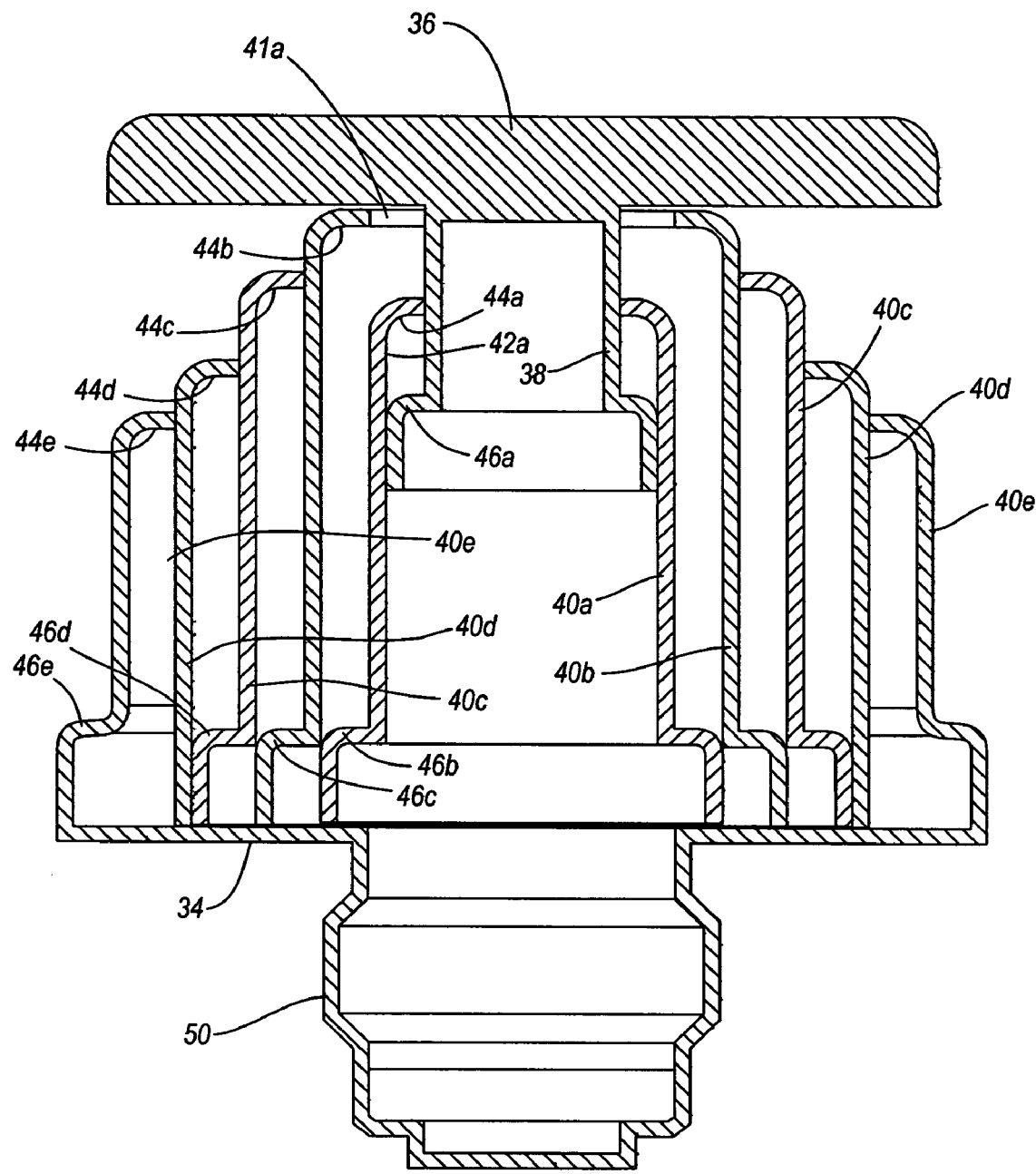
FIG. 5 is a cross-section view of a telescoping mechanism in a collapsed position.

Telescoping mechanism 30 further comprises a plurality of sections 40a-e that are sized to collapse into one another. FIG. 5 is a cross-sectional view of telescoping mechanism 30 in a collapsed position. Referring now to FIG. 4, each section 40a-d comprises a sidewall 42a-d, shoulder 44a-d and lip 46a-d. Outermost section 40e comprises a sidewall 42e, shoulder 44e and is attached to base 34. Center section 40a is positioned at the center of the sections. Section 40a comprises a top end 41a that is attached to stem 38. While the sections shown in the figures are concentric cylinders, the invention is not intended to be limited to a specific shape. Other shapes, such as squares or pyramids, may be used. The sections may be formed by any suitable method of manufacturing. In one embodiment, the section is stamped metal.

Telescoping mechanism 30 further comprises a pyrotechnic fluid generator 50 in fluid communication with sections 40. Upon impact, fluid generator 50 rapidly introduces fluid against stem 38 and into center section 40a, causing stem 38 and center section 40a to extend away from the other sections. As more fluid is introduced, more pressure is exerted on center section 40a and stem 38, extending the remaining sections 40. While it is expected that center section 40a would extend first, nothing herein restricts the scope of the claims to require the center section to extend first. Telescoping mechanism 30 is an example of means for extending the restraining means from a storage position to a deployed position.

As the telescoping mechanism deploys, sidewall 42 of each section 40 slides along shoulder 44 of the adjacent section. The pressure of the fluid forces the sidewall of the section extending against the shoulder of the adjacent section, thus maintaining a closed system. Each section is prevented from further extension by lip 46 of the adjacent section. Once the sections are fully extended, the seal between the lip and shoulder of adjacent sections is incomplete so that the fluid can vent after deployment and the device can be collapsed sufficiently so that the passenger can move out of the automobile. Stated otherwise, the sections form an imperfectly sealed chamber. In addition to incomplete seals or as an alternative to incomplete seals, one or more of the sections may also contain vent holes to allow the fluid to escape the chamber. O-rings may be located between each section to seal the sections together. The leak rate of the fluid of the telescoping mechanism may be tuned for different crash impulses.

In one embodiment, the device is pressurized for up to 100 milliseconds, and then slowly depressurizes. The device may also comprise at least one section sensitive to over-pressurization so that the sidewall of the section will burst upon over-pressurization. Such a section would be beneficial when the passenger is positioned close to the instrument panel or for out-of-position deployments.

Fluid generators typically comprise gas generants, a squib, and wire terminals. The wire terminals are connected to a sensor. When the sensor detects an impact, the wire terminals send a signal to the squib. The squib ignites and causes the gas generants to activate and rapidly generate gas. The fluid generating cylinder may be attached to the sections of the telescoping mechanism by a lip at the base of the outermost section. In addition, an o-ring may be positioned inside the lip of the outermost section to seal the telescoping mechanism sections to the fluid generating cylinder.

Figure 6A:
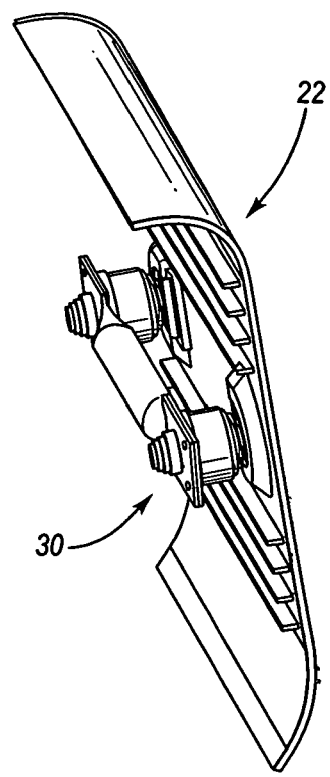
FIGS. 6A-6F are perspective views of a telescoping pyrotechnic device in different stages of deployment.
Figure 6B:
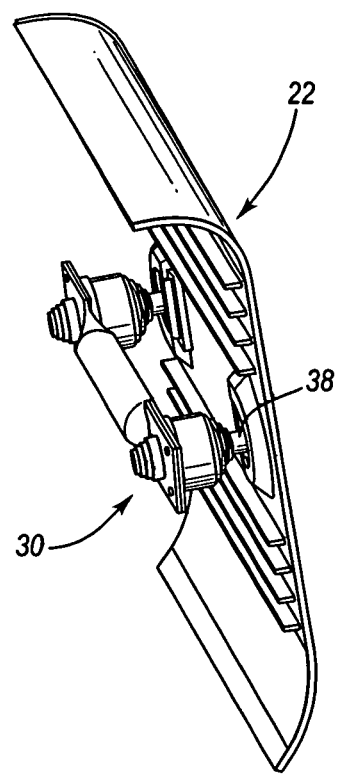
Figure 6C:
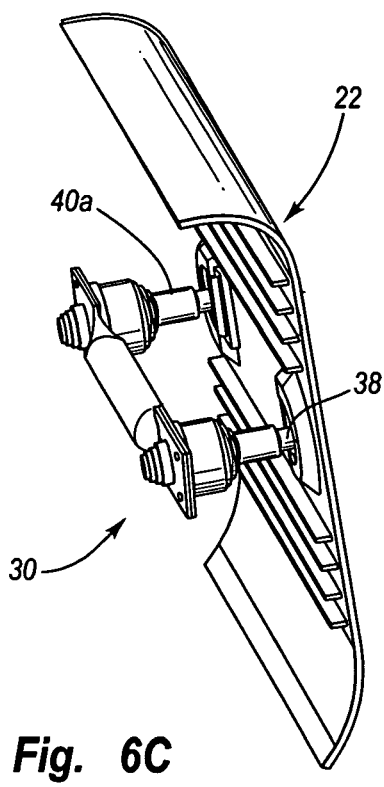
Figure 6D:
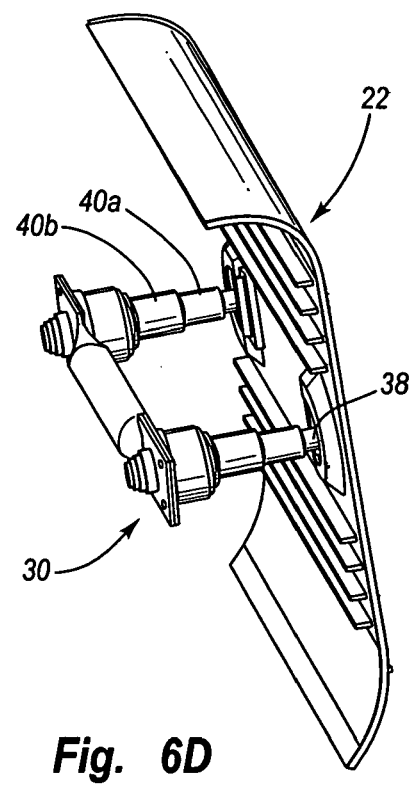
Figures 6E, 6F:
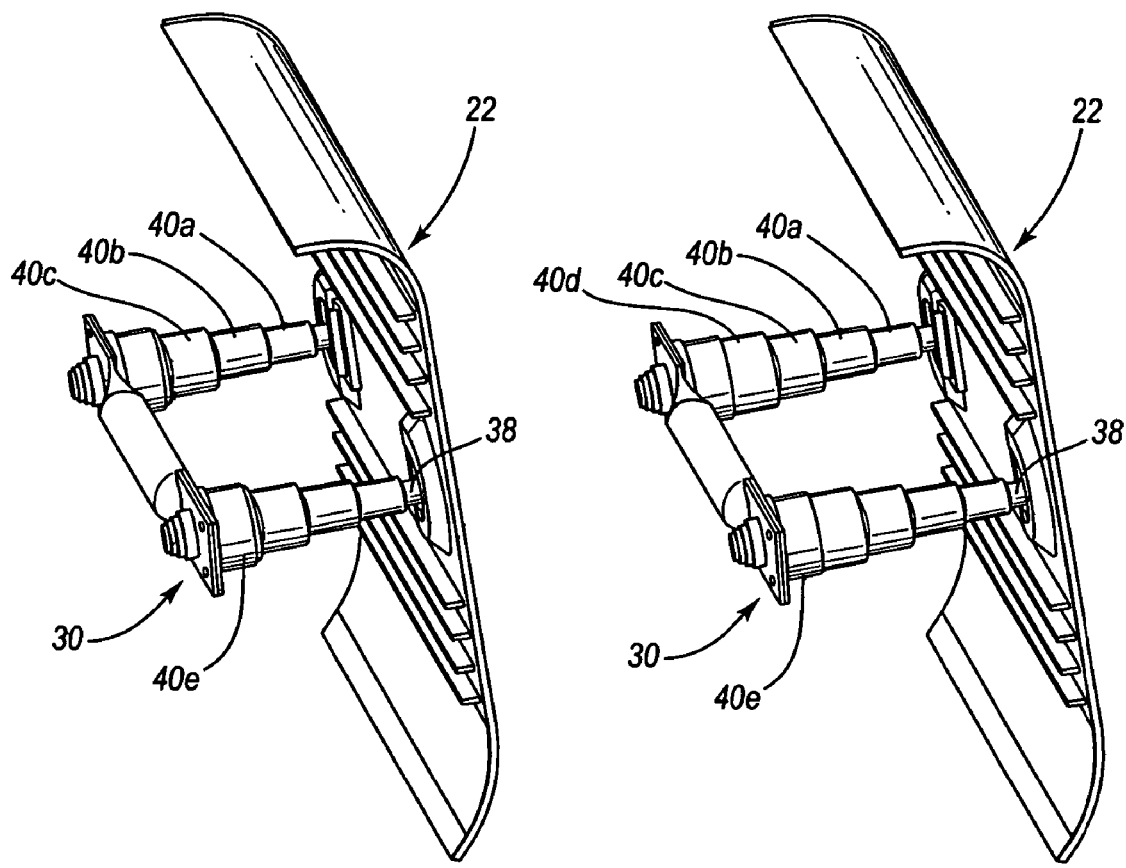

FIGS. 6A through 6F show perspective views of an embodiment of the safety bolster in different stages of deployment. FIG. 6A is a view of the device in the collapsed, stored position. FIGS. 6B-6E show progressively extended positions and FIG. 6F shows the safety bolster in its fully extend position. Fluid generator 50 is an example of a fluid generating means for rapidly introducing fluid into the extending means.

The device may be mounted on any portion of an automobile for which restraint of a passenger is described. The illustrated embodiment is designed to be mounted in an automobile instrument panel, with front face 22 facing the knees and lower legs of a passenger of the automobile. This knee bolster embodiment may be mounted on the automobile's cross-car beam. In another embodiment, the device may be mounted in a door panel as a pelvic restraint.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims. It will be obvious to those having skill in the art that many changes may be made to the details of the above-described embodiments without departing from the underlying principles of the invention. The scope of the present invention should, therefore, be determined only by the following claims. Note also that elements recited in means-plus-function format are intended to be construed in accordance with 35 U.S.C. § 112¶6.

The invention claimed is:

1. An automotive safety device comprising:
    a bolster, having a front face and back face, wherein the front face is adapted to be positioned opposite a vehicle occupant,
    a telescoping mechanism, connected to the back face of the bolster,
        wherein the telescoping mechanism is adapted to extend when pressurized by introduction of fluid into the telescoping mechanism and to depressurize by venting the fluid following extension,
        wherein the telescoping mechanism comprises a plurality of nested sections,
        wherein the sections are configured such that a shoulder of one section engages a lip of an adjacent section with a seal that is incomplete so that fluid can vent after deployment and so that the device can collapse after deployment.

2. The safety device as claimed in claim 1, wherein the device is configured to be mounted on an instrument panel of an automobile.

3. The safety device as claimed in claim 1, wherein the device is configured to be in a door of an automobile.

4. The safety device as claimed in claim 1, wherein the telescoping mechanism is in fluid communication with a fluid generator.

5. The safety device as claimed in claim 1, further comprising a fluid generator connected to an impact sensor, and wherein the fluid generator is positioned for fluid communication with the nested sections of the telescoping mechanism.

6. The safety device as claimed in claim 1, wherein the sections comprise metal.

7. The safety device as claimed in claim 1, wherein the telescoping mechanism comprises an attachment tip that is inserted into a cavity in the rear face of the bolster.

8. The safety device as claimed in claim 7, wherein a locking bar is welded across the cavity to lock the attachment tip in the cavity.

9. The safety device as claimed in claim 7, wherein the attachment tip is flexibly mounted to the bolster.

10. The safety device as claimed in claim 1, wherein the safety device comprises an additional telescoping mechanism.

11. A safety device for use in an automobile comprising:
    means for restraining a passenger of an automobile following an impact,
    a telescoping mechanism configured to extend the restraining means from a storage position to a deployed position, and
    fluid generating means for rapidly introducing fluid into the telescoping mechanism,
        wherein the telescoping mechanism retracts by venting the fluid following deployment,
        wherein the telescoping mechanism comprises a plurality of nested sections,
        wherein the sections are configured such that a shoulder of one section engages a lip of an adjacent section with a seal that is incomplete so that fluid can vent after deployment and so that the device can collapse after deployment.

* * * * *